United States Patent [19]

Nilsson et al.

[11] Patent Number: 5,032,270
[45] Date of Patent: Jul. 16, 1991

[54] THICKENER

[76] Inventors: Harry Nilsson, Nägeliweg 7, CH-8274 Tägerwilen, Switzerland; Bjarne Nilsson, Lanterngatan 9, S-462 55 Vänersborg, Sweden

[21] Appl. No.: 411,538

[22] PCT Filed: Feb. 3, 1989

[86] PCT No.: PCT/SE89/00042
§ 371 Date: Oct. 3, 1989
§ 102(e) Date: Oct. 3, 1989

[87] PCT Pub. No.: WO89/07003
PCT Pub. Date: Aug. 10, 1989

[30] Foreign Application Priority Data

Feb. 3, 1988 [SE] Sweden ................................ 8800346

[51] Int. Cl.$^5$ ............................................. B01D 33/21
[52] U.S. Cl. .................................... 210/331; 210/327; 210/346; 210/486
[58] Field of Search ............... 210/324, 330, 331, 346, 210/347, 359, 327, 340, 341, 345, 486

[56] References Cited

U.S. PATENT DOCUMENTS

| 4,056,473 | 11/1977 | Nilsson | 210/331 |
| 4,634,529 | 1/1987 | Nilsson | 210/331 |
| 4,678,574 | 7/1987 | Niiranen et al. | 210/331 |
| 4,781,835 | 11/1988 | Bahr et al. | 210/331 |
| 4,814,093 | 3/1989 | Frykhult | 210/331 |

Primary Examiner—Jay H. Woo
Assistant Examiner—James P. Mackey
Attorney, Agent, or Firm—Pollock, Vande Sande & Priddy

[57] ABSTRACT

A filter for thickening fiber suspensions or other liquids containing solid material includes a plurality of rotatable filter disks (3) mutually spaced in axial direction and adapted to be partially submerged in a liquid (5) to be filtered. Each filter disk includes a plurality of filter sectors (4) communicating with axial filtrate discharge ducts (2) at the outer peripheries of the filter disks (3) for removal of filtrate. The axial filtrate discharge ducts (2) are open to atmosphere at at least one end (2') thereof for the purpose of conducting air through these ducts into the interior of the filter sections to replace filtrate flowing out. Advantageously, there is communication between all axial filtrate discharge ducts through annular filter disk holders (1) carrying the filter sectors (4) of the filter disks.

5 Claims, 3 Drawing Sheets

THICKENER

FIELD OF THE INVENTION

The present invention relates to a thickener, i.e., an apparatus for raising the dry solids content in suspensions, such as fiber suspensions, by means of filtering. Such an apparatus includes a plurality of rotatable filter disks mutually spaced in axial direction and adapted to be partially submerged in a liquid or a suspension to be filtered, each disk comprising a plurality of filter sections communicating with axial ducts arranged at the outer peripheries of the filter disks for removal of filtrate.

BACKGROUND OF THE INVENTION

Apparatuses of this kind are known, inter alia, from SEC-C-8305817-2 (corresponding to EP-B1-0160069 and U.S. Pat. No. 4 634 529) and have the advantage of combining a very large filter surface with a relatively small volume. However, when it comes to achieving thickening of a fiber suspension, i.e., raising the dry solids content from typically 0.5% to typically 5%, very high capacity, i.e., a large filtrate flow through the apparatus, is required. One way of increasing the flow capacity is to increase the rotation rate. However, a high rate of rotation means that the filter sections do not have time to be emptied of filtrate before the sections reach the position where the filter cake is to be removed. The reason for this is that the filter cake that is built up has time to be too dense to pass through sufficient air to replace the filtrate flowing out. It can thus occur that the filtrate wets the filter cake remaining on the filter section, or that the filtrate together with the filter cake runs down into the collection vessel intended for the filter cake. This phenomenon is usually referred to as re-wetting or "backwash". The known apparatuses are moreover expensive to manufacture, inter alia because they require a vacuum valve and a vacuum source for establishing a sufficiently large pressure difference between the suspension and the filtrate discharge duct.

SUMMARY OF THE INVENTION

The object of the present invention is to provide a thickener apparatus which allows a high rate of rotation and hence high capacity, and which does not require an outside vacuum source, but is thus simple and cheap in manufacture.

BRIEF DESCRIPTION OF THE DRAWINGS

The invention will now be described with reference to the accompanying drawings, wherein several embodiments are shown for purposes of illustration, and wherein.

DESCRIPTION OF PREFERRED EMBODIMENTS

Figure 1:
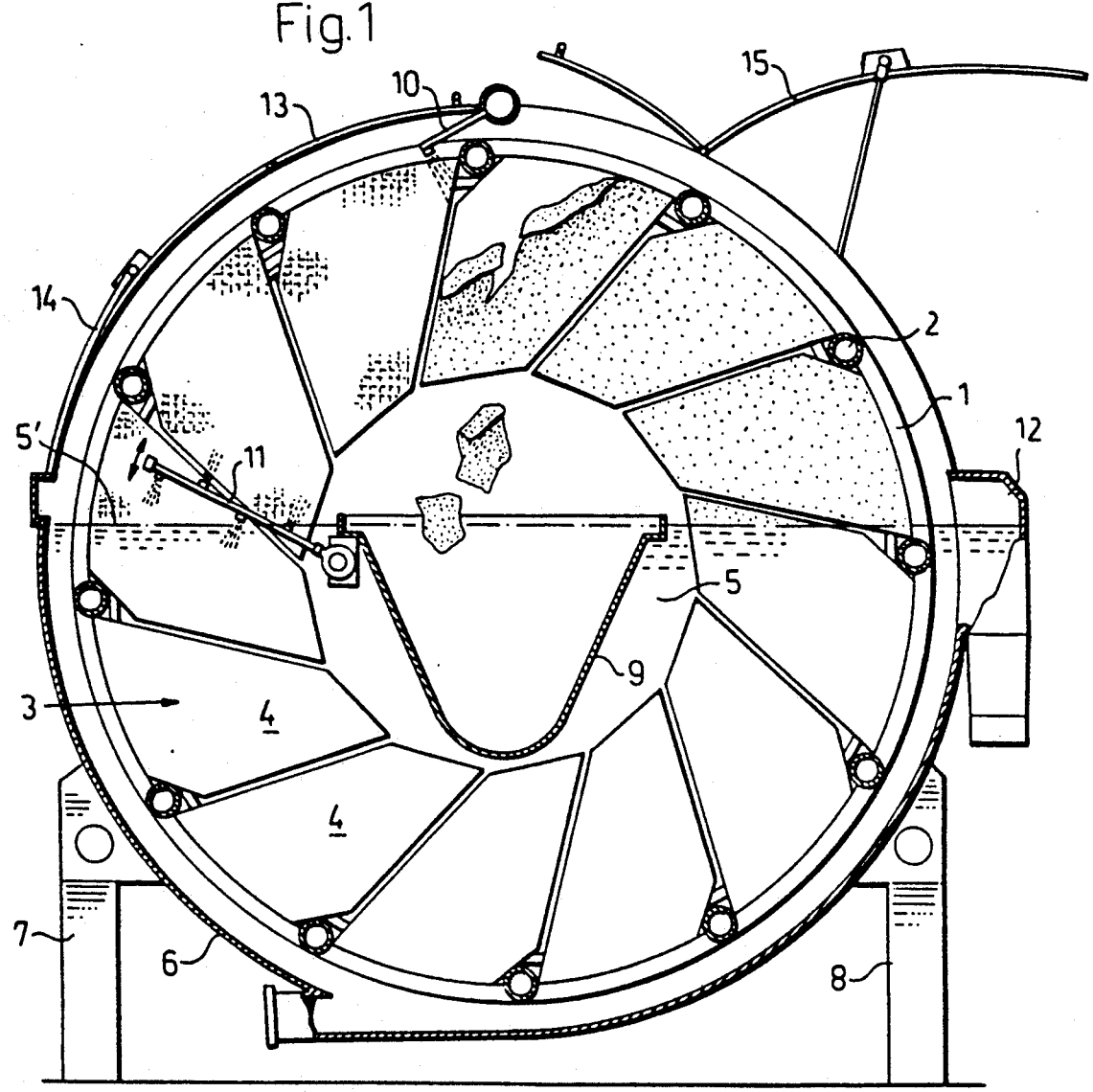
FIG. 1 is a cross section through a thickener with a plurality of annularly arranged filter sectors.

A thickener in accordance with the invention includes a filter rotor having a plurality of annular filter disk holders 1 arranged axially in sequence, and filtrate ducts 2 axially connecting the holders 1. FIG. 1 is a cross section through such a filter rotor, which is rotatable counter-clockwise as seen in the figure, and which carries an annular filter disk 3 comprising a plurality of filter sections 4. The interior of each filter section 4 is in communication with an associated axial filtrate duct 2, namely, the closest trailing filtrate duct 2 in the direction of rotation. All the filter disks of the filter are partially submerged in the liquid or suspension 5 to be thickened (filtered) and which is received in a container 6. The container 6 rests on a foundation 7,8. Through the central opening of the filter disks extends a collecting trough 9 for solid material, such as cellulose fibers, which are deposited on the filter sections during thickening and are caused to fall optionally with the aid of a jet 10, from the filter sections when they are above the trough 9. An oscillating spray means 11 may be provided for washing off particles from the filter sections. The structure also includes an inlet 12 for suspension and a casing 13 over the rotor, which has two inspection hatches 14 and 15, of which the hatch 15 is shown in open position.

Figure 2:
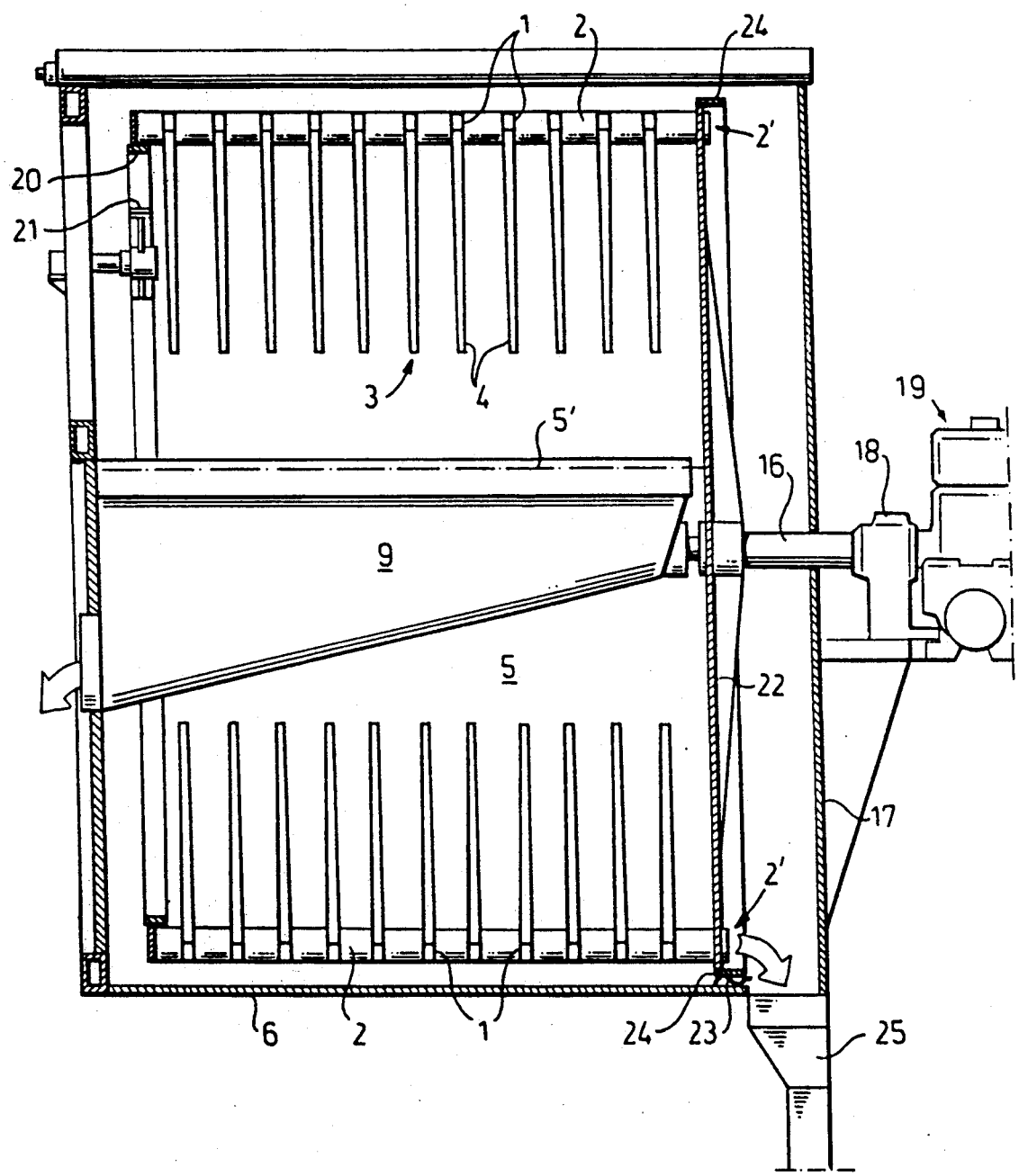
FIG. 2 is an axial section through the thickener according to FIG. 1.

In FIG. 2 illustrates how one end of the rotor is journalled by means of a drive shaft 16 in a bearing 18 carried by the rotor housing 17. A drive motor, gearing, etc. are indicated at 19. At the other, open end of the rotor, through which the collection trough 9 is inserted, the rotor is terminated by a carrier ring 20 which is carried by and slides on sliding pads 21 mounted in the rotor housing 17.

Up to this point 1, the thickener in accordance with the invention corresponds generally to a known filter. However, in the latter, the axial filtrate ducts 2 in the closed end of the rotor (at the right in FIG. 2), are directed substantially radially inwards, and close to the center directed axially outwards through the container wall to a suction box, which is in communication with a so-called barometric leg or other vacuum source. Upon rotation of the rotor, the axial filtrate ducts, and thus the filter sections which are lowered below the suspension surface, are placed one at a time in communication with the suction box for sucking the filtrate through the filter sections to the axial filtrate ducts and further to the suction box. Connection to the suction box ceases when the filter sections associated with an axial filtrate duct are at a certain point above the suspension surface.

When filtering proceeds with relatively low flows (up to 15000 l/min) and low rates of rotation (0.2 –0.6 rpm) the known filter is excellent. With increasing flows and rotation rates there occurs, inter alia, what is usually called a "bottle effect", signifying that a filter section rising above the suspension surface does not have time to empty its filtrate contents into the associated axial filtrate duct during the time the filtrate duct is at a level under some part of the associated filter section. The reason for this is that air does not have time to flow to a sufficient degree into the filter section, through its filter means, such as filter cloth with a fiber layer deposited thereon, to replace the filtrate flowing out, the filtrate then running back through the filter means and re-wetting the filter cake.

In accordance with the invention, to overcome this problem, the axial filtrate ducts have direct communication with the atmosphere. More specifically, the ducts open out into the atmosphere outside the suspension container. In this way, air can flow into the filtrate ducts as soon as their entire cross section is not occupied by filtrate flowing out, or, is situated beneath a possible filtrate surface at the outlet. FIG. 2 shows how this can be arranged in practice.

A circular, liquid tight disk 22 is non-rotatably attached to the shaft 16. The axial filtrate ducts 2 are mounted in the disk 22 close to its outer periphery and open out with open ends 2' on the drive side of the disk. A sealing strip 23 sealing against the disk 22 extends along the inside of the container 6 at least up to the maximum suspension level 5'. In the illustrated example, the sealing strip engages with a sliding seal against an annular, axially directed flange 24 at the outer periphery of the disk 22. The disk 22 and the sealing strip 23 thus define the suspension-containing volume of the container, and in practice constitute a rotating container wall. Outside this rotating container wall 22 an outlet 25 for the filtrate is arranged in the bottom of the container 6 or outside the container itself. Atmospheric pressure prevails in the entire thickener, i.e., at the suspension surface inside the rotor as well as outside the disk 22 and at the outlet 25.

As will be understood from the foregoing, upon rotation of the rotor there is created a static pressure difference between the suspension in the container 6 and the interior of the filter sections 4, since latter are in communication with the atmosphere via the open ends of the axial filtrate ducts 2. This pressure difference goes from zero, when a filter section is lowered into the suspension, via a maximum at the bottom of the container, and back to zero when a filter section rises above the suspension surface.

The pressure difference forces the filtrate through the filter means of the filter sections, solid particles such as cellulose fibers then being deposited on the filter means. The varying underpressure, independent of an exterior constant vacuum source, brings about the desirable result that the pressure difference first increases in time with the increasing layer of solid particles on the filter means, causing the flow to be kept at a substantially uniform level during the first half of the interval during which a filter section is located under the suspension surface. During the remainder of this time, the pressure difference decreases, and hence the flow through the filter means, decreases which giving the filtrate a possibility of running off via the axial filtrate ducts, while the filter section rises above the suspension surface. In a thickener in accordance with the invention, this run-off can take place entirely without replacement air through the filter means, since replacement air is supplied through the axial filtrate ducts 2 opening out to atmosphere.

For to regulate the static pressure difference, arranged for varying the filtrate level at the outlet 25 can be varied, e.g. a by means of, an adjustable valve, which can be controlled by a level-sensing transducer.

Figure 3:
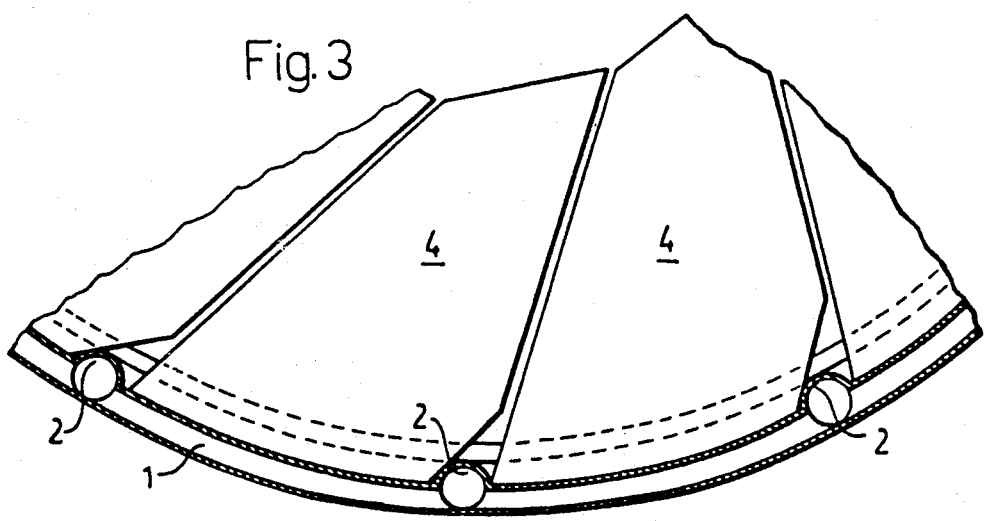
FIG. 3 is an enlarged detail of a filter rotor of a thickener according to FIG. 1.

A filter section 4 normally has an outlet to the filter disk holder 1 only in the part of the section closest to the associated axial filtrate duct 2, and the filter disk holder has communication only with this filtrate duct. To ensure that the maximum flow capacity of the axial filtrate ducts is utilized, the invention provides for mutual communication between the axial filtrate ducts 2. As shown in FIG. 3, this is achieved by the filter disk holder 1 functioning as a filtrate conductor along its entire circumference and having communicating with all axial filtrate ducts 2. Accordingly, the filtrate ducts situated lowest at a given time will run filled with filtrate that is flowing off, while the filter sections 4 and associated filter ducts 2 approaching or departing from the suspension surface 5' can directly pass on their filtrate contents to a duct situated at a lower level. By this accelerated emptying of the rising axial filtrate ducts, an early supply of replacement air through the axial filtrate ducts can be ensured.

Figure 4:
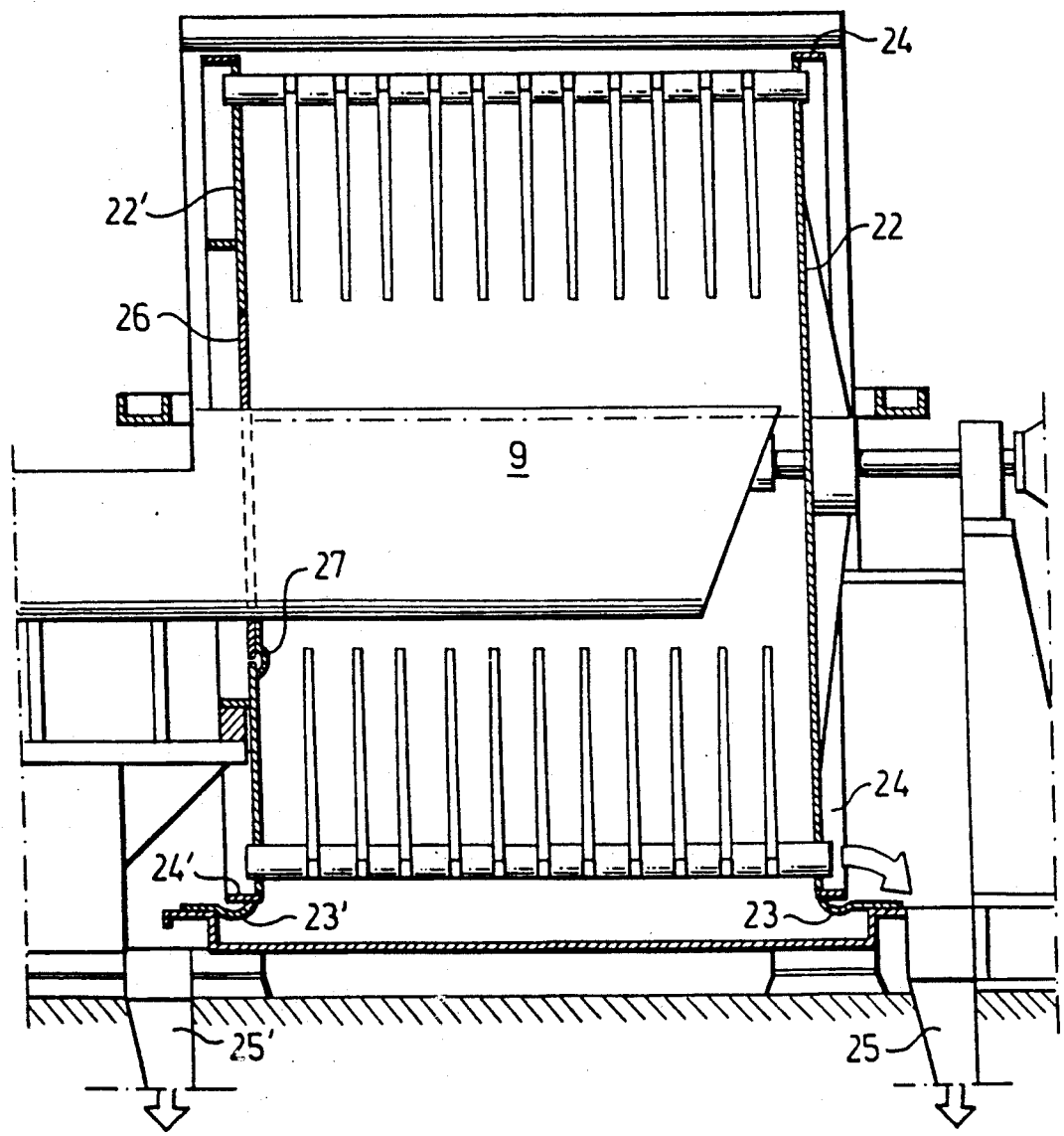
FIG. 4 is an axial section through a further embodiment of the thickener according to the invention.

Instead of being open at one end, as illustrated in FIG. 2, the axial filtrate ducts can be open at both ends, as illustrated in FIG. 4.

The principal difference between the latter embodiment and the former one is that both end walls 22 and 22' of the filter rotor must constitute rotating container walls. Accordingly, there is also a sealing strip 23' and a flange 24' for sealing the other container end, as well as an outlet 25'. If the suspension level in the container is to be the normal one, i.e., close to the upper edge of the collection trough 9, a seal must also be arranged around the trough. In this example, an at least partially (i.e., at least under the suspension level) circular plate 26 is sealingly and rigidly mounted on the trough, said plate carrying at at its outer periphery a sealing strip 27, similar to the sealing strips 23 and 23'. This strip provides a sliding seal against the edge of the circular opening for the collection trough 9 made in the rotating container wall 22'.

We claim:

1. A filter for thickening fiber suspensions or other liquids containing solid material, said filter including a plurality of rotatable filter disks having radially outer peripheries and being mutually spaced in an axial direction of said filter disks, said filter disks being adapted to be partially submerged in a liquid to be filtered and each disk comprising a plurality of filter sectors communicating with axial filtrate discharge ducts at said radially outer peripheries of said filter disks for removal of filtrate, wherein each of said axial filtrate discharge ducts is constantly open to atmosphere at at least one end thereof.

2. A filter as claimed in claim 1, wherein said axial filtrate discharge ducts in said at least one end are open towards an outlet for receiving filtrate, said outlet being in communication with atmosphere.

3. A filter as claimed in claim 2, including means for regulating a level of filtrate at said outlet.

4. A filter as claimed in claim 1 or 2, wherein said axial filtrate discharge ducts are inter-communicating.

5. A filter as claimed in claim 4, wherein said filter sectors of each of said filter disks are carried by an annular filter disk holder, communication between said axial filtrate ducts being established through said annular filter disk holder.

* * * * *